(12) United States Patent
Wee et al.

(10) Patent No.: US 7,885,604 B2
(45) Date of Patent: Feb. 8, 2011

(54) METHOD AND SYSTEM FOR INTERFERENCE REDUCTION

(75) Inventors: Daniel Wee, Garland, TX (US); Hang Li, Allen, TX (US); Weidong Yang, Schaumburg, IL (US); Guanghan Xu, Garland, TX (US)

(73) Assignee: Cisco Technology, Inc., San Jose, CA (US)

( * ) Notice: Subject to any disclaimer, the term of this patent is extended or adjusted under 35 U.S.C. 154(b) by 854 days.

(21) Appl. No.: 11/437,998

(22) Filed: May 18, 2006

(65) Prior Publication Data

US 2007/0010203 A1    Jan. 11, 2007

Related U.S. Application Data

(60) Provisional application No. 60/684,025, filed on May 23, 2005.

(51) Int. Cl.
*H04B 1/00* (2006.01)
*H04B 7/212* (2006.01)
*H04B 7/00* (2006.01)
*H04B 15/00* (2006.01)
*H04J 4/00* (2006.01)
*H04W 24/00* (2009.01)

(52) U.S. Cl. .................. 455/63.1; 370/347; 370/436; 355/424; 355/456; 355/502; 355/503

(58) Field of Classification Search .......... None
See application file for complete search history.

(56) References Cited

U.S. PATENT DOCUMENTS

| | | | |
|---|---|---|---|
| 5,883,887 A * | 3/1999 | Take et al. | 370/329 |
| 5,930,295 A * | 7/1999 | Isley et al. | 375/219 |
| 6,308,077 B1 * | 10/2001 | Walsh | 455/503 |
| 6,480,483 B2 * | 11/2002 | Yahata et al. | 370/350 |
| 6,493,561 B1 * | 12/2002 | Hasegawa | 455/512 |
| 6,498,790 B1 * | 12/2002 | Shaheen et al. | 370/347 |
| 6,570,860 B2 * | 5/2003 | Hamalainen et al. | 370/329 |
| 6,580,930 B1 * | 6/2003 | Fulghum et al. | 455/574 |
| 6,658,258 B1 * | 12/2003 | Chen et al. | 455/456.1 |
| 6,791,959 B1 * | 9/2004 | Palmer et al. | 370/332 |
| 6,799,044 B1 * | 9/2004 | Wesby et al. | 455/452.1 |
| 6,885,650 B1 * | 4/2005 | Schindler | 370/336 |

(Continued)

FOREIGN PATENT DOCUMENTS

WO    WO 2005/022792    3/2005

(Continued)

*Primary Examiner*—Duc Nguyen
*Assistant Examiner*—Ayodeji Ayotunde

(57) ABSTRACT

A method and system for interference reduction for telecommunication systems are disclosed. The system comprises a base station control device (BCD) for configuring one or more parameters for operating one or more base stations (BSs), a first BS covering a first cell having one or more mobile terminals therein, a second BS covering a second cell neighboring to the first cell and sharing a predetermined frequency band with the first cell, wherein one or more radio frames constructed for communications between the first BS and any mobile terminal of the first cell and one or more radio frames constructed for communications between the second BS and any mobile terminal of the second cell are distinguishable by defining different channel configuration sets having one or more operation parameters, wherein the parameters includes a training sequence, a spreading code, and a channel observation window position.

32 Claims, 9 Drawing Sheets

U.S. PATENT DOCUMENTS

| | | | |
|---|---|---|---|
| 6,961,393 B1* | 11/2005 | Cupo et al. | 375/343 |
| 6,996,375 B2* | 2/2006 | Dent et al. | 455/67.16 |
| 7,050,415 B2* | 5/2006 | Herrmann et al. | 370/338 |
| 7,068,676 B1* | 6/2006 | Sugaya et al. | 370/445 |
| 7,321,776 B2* | 1/2008 | Camp et al. | 455/456.1 |
| 2002/0009974 A1* | 1/2002 | Kuwahara et al. | 455/67.6 |
| 2002/0044564 A1* | 4/2002 | Ranta | 370/436 |
| 2002/0098839 A1* | 7/2002 | Ogino et al. | 455/424 |
| 2002/0110102 A1* | 8/2002 | Wei et al. | 370/335 |
| 2002/0122406 A1* | 9/2002 | Chillariga et al. | 370/347 |
| 2002/0150070 A1* | 10/2002 | Shattil | 370/342 |
| 2003/0043775 A1* | 3/2003 | Kikuchi | 370/342 |
| 2004/0114695 A1* | 6/2004 | Astely et al. | 375/343 |
| 2004/0120289 A1* | 6/2004 | Hamalainen et al. | 370/335 |
| 2004/0156313 A1* | 8/2004 | Hofmeister et al. | 370/229 |
| 2005/0075110 A1* | 4/2005 | Posti et al. | 455/452.1 |
| 2006/0165120 A1* | 7/2006 | Karabinis | 370/466 |

FOREIGN PATENT DOCUMENTS

WO  WO 2005022792 A2 *  3/2005

* cited by examiner

| T1 | TCC with SC 1 | CCW 1 | TCC with SC 1 | Uplink frame for cell #1 |
| T2 | TCC with SC 2 | CCW 2 | TCC with SC 2 | Uplink frame for cell #2 |
| T4 | TCC with SC 4 | | CCW 4 | TCC with SC 4 | Uplink frame for cell #4 |

| PA1 | T1 | TCC with SC 1 | CCW 1 | TCC with SC 1 | Downlink frame for cell #1 |
| PA2 | T2 | TCC with SC 2 | CCW 2 | TCC with SC 2 | Downlink frame for cell #2 |
| PA4 | T4 | TCC with SC 4 | | CCW 4 | TCC with SC 4 | Downlink frame for cell #4 |

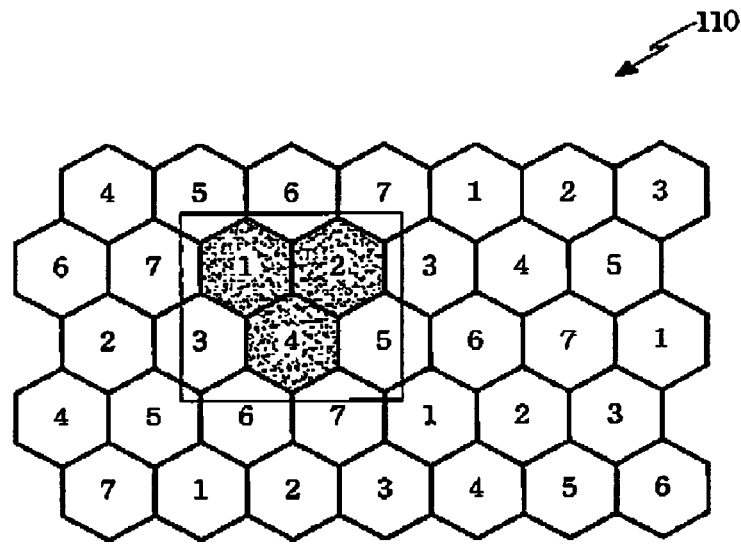
F I G. 2
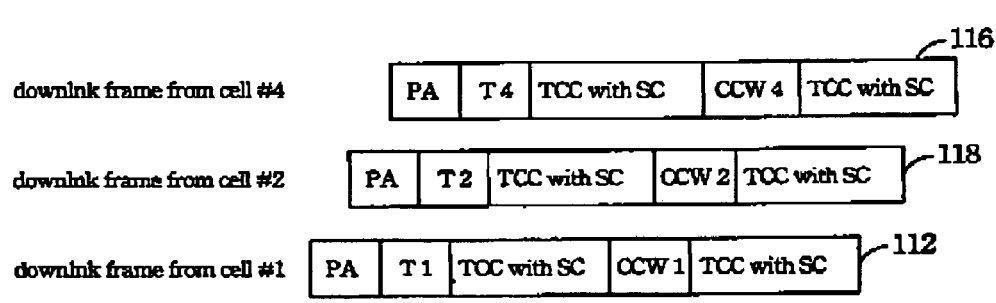
F I G. 3

| P1 | T1 | TCC with SC 1 | CCW 1 | TCC with SC 1 | Uplink frame for cell #1
| P2 | T2 | TCC with SC 2 | CCW 2 | TCC with SC 2 | Uplink frame for cell #2
| P4 | T4 | TCC with SC 4 | CCW 4 | TCC with SC 4 | Uplink frame for cell #4
| PA 1 | T1 | TCC with SC 1 | CCW 1 | TCC with SC 1 | Downlink frame for cell #1
| PA 2 | T2 | TCC with SC 2 | CCW 2 | TCC with SC 2 | Downlink frame for cell #2
| PA 4 | T4 | TCC with SC 4 | CCW 4 | TCC with SC 4 | Downlink frame for cell #4
F I G . 9
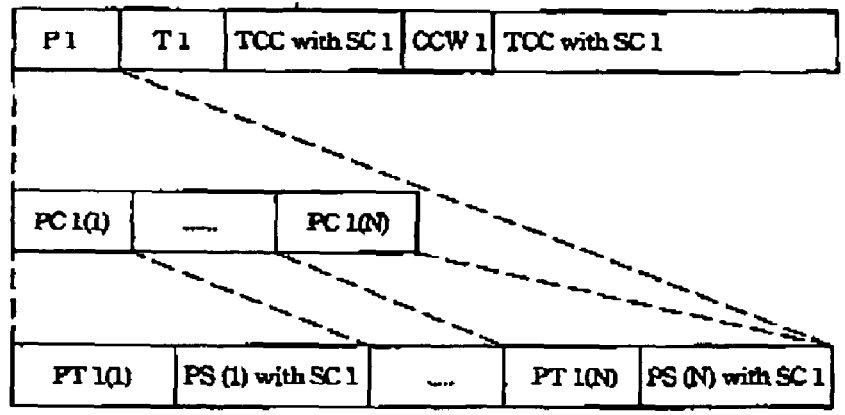
F I G . 10

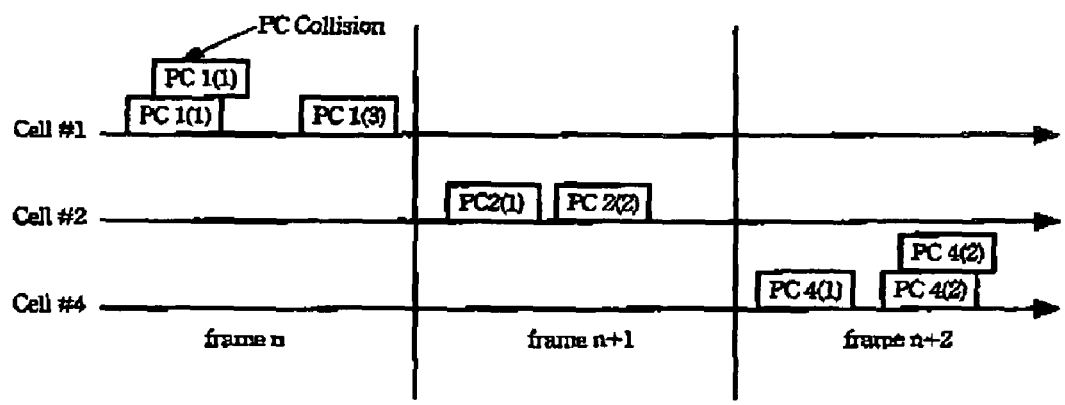
F I G. 12
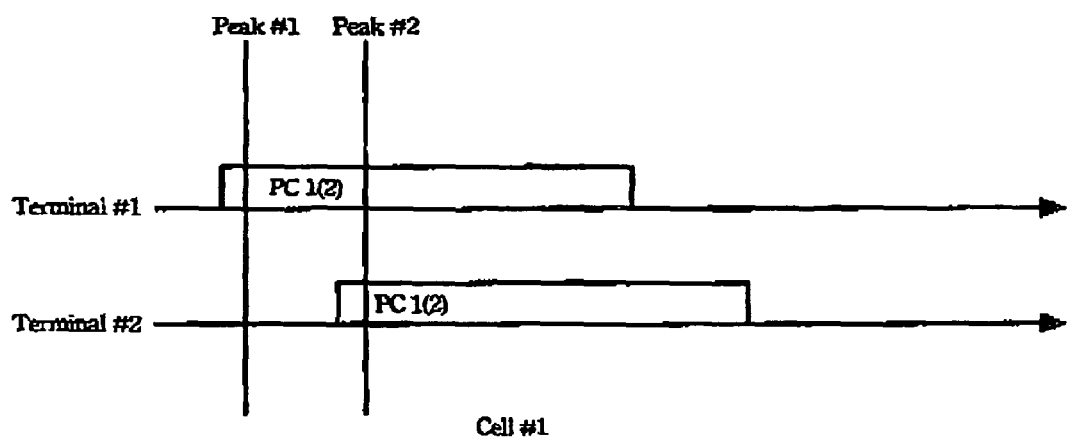
F I G. 13

METHOD AND SYSTEM FOR INTERFERENCE REDUCTION

CROSS REFERENCE

The present application claims the benefits of U.S. Provisional Patent Ser. No. 60/684,025, which was filed on May 23, 2005 entitled "Method and Apparatus for Interference Reduction Via Joint Spreading Code, Training and Channel Observation Window Assignment and Thereof."

BACKGROUND

The invention relates to wireless communications systems in general, and more particularly to method and apparatus for reducing interferences in signal detection for the wireless communications systems.

A wireless communications system is designed to allow a large number of mobile terminals to access communications infrastructures via wireless media simultaneously. A popular cellular structure for the wireless communications system is to place multiple base stations to cover a large area having multiple cells, with each base station being an access point covering one cell. Once physically entered into a cell, a plurality of mobile terminals may select the same base station of the cell to conduct the communication at the same time.

Since the frequency spectrum is limited, in order to increase the use efficiency of the frequency spectrum, it is desirable for some cells (with their corresponding mobile terminals and base stations) to use the same radio frequency (RF). The so-called "frequency reuse" mechanism can be used along with various access techniques, such as Code Division Multiple Access (CDMA), Multi-carrier CDMA (MC-CDMA), and Time Division Multiple Access (TDMA). It is a challenge to maximize the frequency reuse, and various mechanisms have been implemented for assigning and arranging the frequencies.

In a wireless communications system implemented with the frequency reuse scheme, a signal transmitting in one cell is degraded by signals transmitting in its neighboring cells. Such degradation is referred to as "inter-cell interference." Inter-cell interference and thermal noise are collectively referred to as "other interference" (OI).

The mobile terminal and the base station communicates through a wireless communications channel, and the wireless communications channel can be impaired by channel delay dispersion due to multi-path channels or RF chain distortion. Depending on the modulation types and access schemes, channel delay dispersion can cause various kinds of signal degradation. For example, inter-symbol interference (ISI) is often seen in the system using TDMA, while inter-code interference (ICI) and multiple access interference (MAI) are usually found in the system using CDMA or MC-CDMA.

For the base stations equipped with smart antennas, OI can be reduced using a nulling or beamforming algorithm for the downlink, uplink or both. ISI, MAI, and ICI can be reduced using methods, such as equalization, joint detection, nulling, or beamforming, for the uplink, downlink or both. The effectiveness for utilizing these interference reduction methods largely hinges on the accurate knowledge of channel characteristics available to both the transmitter and receiver of the system.

Specifically, the channel characteristics include the channel delay dispersion and OI characteristics. It is well known that a training sequence can be used to estimate channel characteristics. However, even using the training sequence, the accuracy of the estimation can be greatly impaired by the presence of inter-cell interference. Therefore, the methods for reducing interference, such as joint detection or equalization, may not work very well.

What is needed is a method and system to accurately estimate channel characteristics for improving the effectiveness of the techniques used for reducing interferences of a wireless communications system.

SUMMARY

A method and system for interference reduction for telecommunication systems are disclosed. According to one embodiment of the present invention, the system comprises a base station control device (BCD) for configuring one or more parameters for operating one or more base stations (BSs), a first BS covering a first cell having one or more mobile terminals therein, a second BS covering a second cell neighboring to the first cell and sharing a predetermined frequency band with the first cell, wherein one or more radio frames constructed for communications between the first BS and any mobile terminal of the first cell and one or more radio frames constructed for communications between the second BS and any mobile terminal of the second cell are distinguishable by defining different channel configuration sets having one or more operation parameters, wherein the parameters includes a training sequence, a spreading code, and a channel observation window position.

BRIEF DESCRIPTION OF THE DRAWINGS

FIG. 2 illustrates an exemplary cell configuration for wireless communications systems.

FIG. 3 illustrates downlink frames with timing offsets in accordance with one embodiment of the present invention.

FIG. 9 illustrates uplink and downlink frames having probing channels that are used for estimating the spatial signature in accordance with another embodiment of the present invention.

FIG. 10 illustrates the structure of the probing channel in accordance with another embodiment of the present invention.

FIG. 12 illustrates an exemplary scheduling for the probing channels in another embodiment of the present invention.

FIG. 13 illustrates an exemplary random timing scheduling for the probing channels in another embodiment of the present invention.

DESCRIPTION

FIG. 1 shows an exemplary wireless communications system 100 having three adjacent cells 102, 104 and 106, in which base stations BS1, BS2 and BS4 are deployed, respectively. The adjacent cells 102-106 may share the same frequency band, which may cause signal interference concerns. To avoid or mitigate the interferences, the communications operated by the base stations BS1, BS2, and BS4 are assigned with different channel configuration sets of operation parameters such as training sequences (Ts), spreading codes (SCs), and channel observation windows (COWs), which are parameters for defining the frame and modulation according to the embodiments of the present invention. In operation, the mobile terminal generates random access packets and traffic data packets in accordance with the assigned spreading code and training sequence. The spreading code is a pseudo random sequence that is used to spread at least traffic messages, control messages, random access messages, and probing messages. The channel observation window is a time frequency slot in which no signal is sent from intra cell communications. The basic training sequence is a pseudo random complex value sequence, of which periodic auto correlation has a cyclic shift orthogonal property.

The base stations are coupled to a base station control device (BCD) 108. BCD 108 stores channel configuration sets for a plurality of base stations under its control. The channel configuration sets are determined as part of a cell planning procedure. In order to reduce the interference, the BCD 108 assigns different sets of Ts, SCs, and COWs to the base stations in neighboring cells. Upon receiving commands from the BCD 108, the base stations configure their respective transmit and receive radio frames. When a mobile station enters a particular cell, it synchronizes with the respective base station and determines the appropriate channel configuration set for communications with the base station. It is understood by those skilled in the art of wireless communications that BCD 108 can be an element management system (EMS) for IP based networks or a base station controller for traditional cellular networks. It is also understood that the channels between the BCD 108 and BS1, BS2 or BS4 can be a packet-switched link based on TCP/IP protocol or a dedicated link.

Figures 1A, 1B:
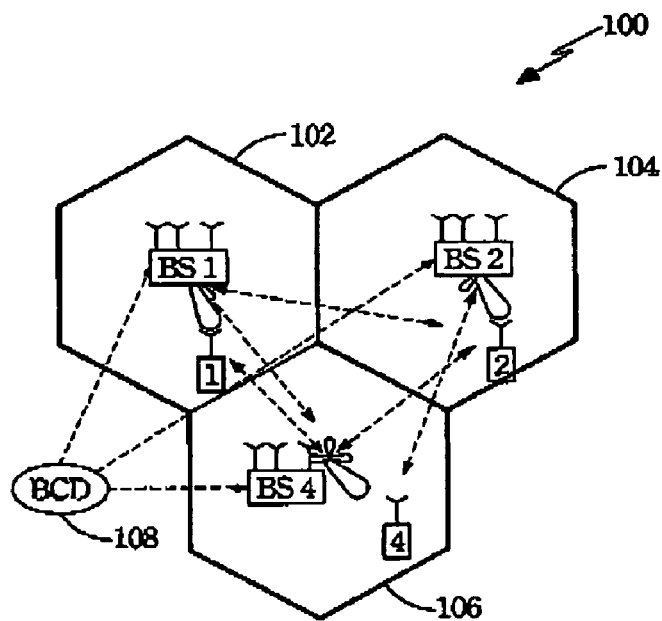
FIG. 1A illustrates an exemplary wireless communications system having three adjacent cells.
FIG. 1B illustrates downlink and uplink frames for the cells.

FIG. 1B illustrates exemplary frame configurations for the cells 102, 104 and 106 shown in FIG. 1A. There are basically four kinds of channels in a downlink: preamble (PA), training channel, traffic/control channel (TCC), and COW. For each base station, the PA channel includes SCs taken from the SC set assigned to the base station; the training channel includes Ts taken from the T set assigned thereto; and TCC includes information bearing symbols that are spread with SCs for the same.

There are basically three kinds of communication channels in an uplink: training channel, TCC, and COW. For each base station, the Ts, SCs and COWs of the uplink channels are also taken from its assigned channel configuration sets, and constitute an integral time slot in a frame. It is noted that these T, SC and COW are not necessarily the same as their counterparts of the downlink channels. It is understood by those skilled in the art that configuration of multiple slots in the frame is also possible in case more accurate channel estimation and/or smaller bandwidth granularity is needed, even though this is not shown in FIG. 1B.

With regard to the downlink frames shown in FIG. 1B, it can be seen that for cells 1, 2, and 4 have different channel configuration sets. For example, they have different training sequences T1, T2, and T4 respectively, different spreading codes SC1, SC2, and SC4, and different locations for COW1, COW2, and COW4. This unique arrangement of having different channel configuration sets allows better detection of interferences, thereby better reduction of the interferences. For instance, cell 1 uses T1, which is detectably different from T2 and T4, when receiving T1 (while T2 and T4 are supposed to be suppressed), any distortion of T1 should be viewed as caused by interferences. Similarly, the COWs are located at different places, and interferences from other cells can be detected as well.

FIG. 2 illustrates an exemplary cell configuration 110 for wireless communications systems according to one embodiment of the present invention. In this configuration, each cell is assigned with a frequency band which is shared by one or more neighboring cells with predetermined channel configuration sets. For example, the numerals 1 through 7 representing seven different channel configuration sets of T, SC, and COW. Each cell has a numeral representing a particular channel configuration set it uses. This configuration has a frequency reuse factor of seven, meaning that a minimum repetitive pattern includes seven cells for which seven different frequency bands are allocated. In such a system configuration, two cells that share the same set of T, SC and COW are separated by at least two other cells.

It can be seen below later that the locations of COW in different channel configuration sets are set apart, and due to this location differences of the COW within the frames, each mobile terminal in a particular cell has to determine the COW location before any downlink message can be decoded. The COW location is determined through a detection of a COW index, which is a part of the carrier acquisition or synchronization procedure performed by the mobile terminal when it enters into a cell. Two methods for detecting the COW index in order to determine the location of COW during a carrier acquisition procedure are presented below in accordance with various embodiments of the present invention.

FIG. 3 shows the frame configurations used by the first method during the carrier acquisition procedure in accordance with one embodiment of the present invention. The frames 112, 114 and 116 are illustrated to show that a mobile terminal is synchronized to a base station in cell 1, while receiving interference signals from cells 2 and 4. The goal is to provide the mobile terminal a much better signal detection on data sent by the base station from cell 1, while eliminating or reducing the interferences caused by the communications conducted in cells 2 and 4.

In this embodiment, the SCs for the PA channels and the TCCs are the same for the frames 112, 114 and 116, while the COWs and training sequences (Ts) are preprogrammed to be different. The COWs are configurable, meaning that the location of the COWs can be determined in a programmable way by the BS without being limited to any pre-fixed locations. The frames 112, 114 and 116 are offset using a global positioning system (GPS) signal as the timing reference to help isolate transmitted signals from the base stations from neighboring cells. The frame offset assignment can be carried out by the BCD during its communication with the base stations through certain commands. It is understood that mobile terminals located close to the cell boundary encounter most of the interference for downlink transmissions. Due to the predetermined frame offsets, interferences arriving at the mobile terminals shall not be synchronous to the traffic signals between the mobile terminal and its designated base station within the home cell. In other words, the intra-cell traffic signals should be synchronized among themselves while the inter-cell signals are not synchronized.

Figure 4:
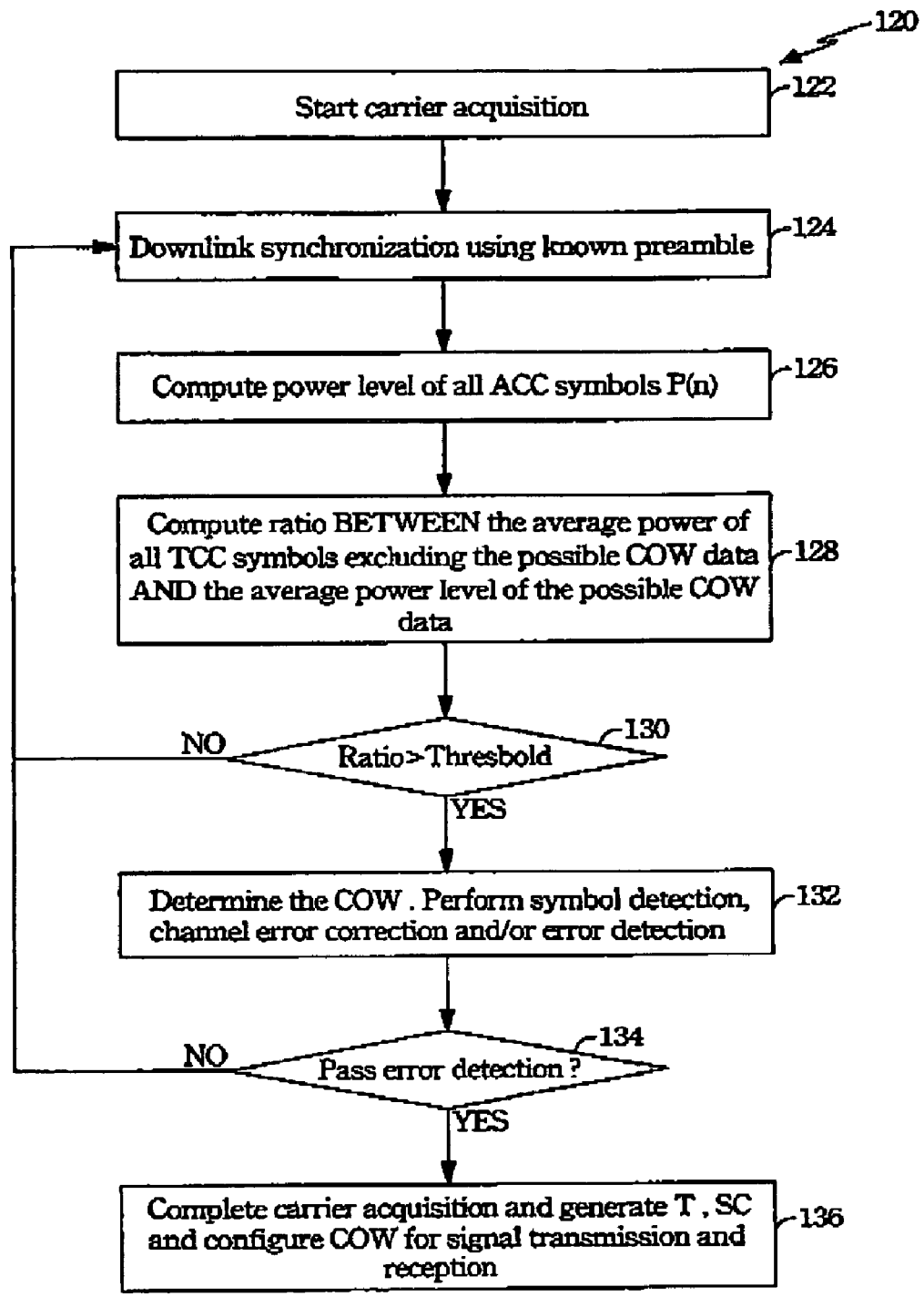
FIG. 4 illustrates a flowchart for detecting a channel observation window index using the offset downlink frames in accordance with another embodiment of the present invention.

FIG. 4 illustrates a flowchart for detecting a COW index using the offset downlink frames shown in FIG. 3. When the mobile terminal starts its process for carrier acquisition in step 122, a downlink communication channel between the mobile terminal and its desired base station is established by synchronizing the signals using a PA channel in step 124 after the mobile station searches for the broadcasted PA from the BS.

The TCC part of the frame contains both traffic channels and control channels. One of the control channels is the downlink access channel (ACC). The power levels of all ACC symbols P(n) in the TCC part of a frame for the synchronized downlink communication are then computed in step 126. Preferably, the COW is located at the symbol boundary, and with a length of multiple symbols. The symbol power levels at the COW shall be much lower than the normal ones. Since decoding the downlink ACC is part of the carrier acquisition procedure, the power level computation shall use the SC assigned for the ACC.

In step 128, the ratio between the average power of all TCC symbols excluding the possible COW data and the average power level of the possible COW data is computed. This is to determine whether the guessed COW is the "real" COW. Suppose the required minimum threshold signal-to-interference-plus-noise ratio (SINR) for detecting the downlink ACC is R. After decoding, the power level for the COW and traffic are given Pcow=Pnoise+Pcell 2+Pcell 4 and Ptraffic=Pnoise+Pcell 1+Pcell 2+Pcell 4, respectively. Once the threshold is set, the criterion for COW detection is given by $$\frac{P_{traffic}}{P_{cow}} = 1 + \frac{P_{cell1}}{P_{noise} + P_{cell2} + P_{cell4}} \geq R+1$$

The ratio is compared with the predetermined threshold value (R+1) in step 130. If the ratio is greater than the predetermined threshold value, the COW is considered to be defined, and the process proceeds to step 132, or otherwise it goes back to step 124 (ignoring the current signals).

The step 132 determines the COW according to a criterion explained below. Supposing U denotes the symbol indices of the whole TCC, and Ui denotes the set containing the continuous symbol indices corresponding to the ith COW, then the criterion for detecting a COW is given as follows:

$$\frac{|U_i| \sum_{n \in U, n \notin U_i} P(n)}{(|U| - |U_i|) \sum_{n \in U_i} P(n)} \geq R+1$$

Essentially, in the above formula, the numerator represents a total power level of the identified positions corresponding to the "most likely" COW position in all symbols, and the denominator represents a total power level of the rest positions. The ratio between these two is compared to "R+1". The detected COW is verified further by employing error correction mechanisms after ACC symbols are detected in step 132. Error correction mechanisms are essential for error-free transmission of digital data. Whenever one digital component is tasked with sending bits to a second component, the possibility for the data set becoming corrupted in route arises. Error correction is made available by adding checksum bits to the packets of data that move between components. These bits allow the receiving component to determine if the packet of data arrived intact.

Alternatively, rotational error correction code can be employed to identify the COW location. For example, ACC symbols and predetermined symbols are encoded using certain block codes, e.g., Reed-Solomon (RS). The RS codes should be able to correct at least |Ui| symbols. ACC symbols and the predetermined symbols are arranged such that the predetermined symbols occupy the exact symbol positions corresponding to the COW position.

An example of a symbol code word is given as follows, assuming the COW occupies three symbols:

$$C = s(1), \ldots s(k), d(k+1), d(k+2), d(k+3), s(k+4), \ldots s(N), p(N+1), \ldots, p(N+m)$$

where s(n) is ACC information, d(k+1), d(k+2), d(k+3) are known symbols replacing the COW positions, and p(N+1), . . . , p(N+m) are parity symbols. At the mobile terminal, the received code word is fed into a decoder thereof for channel decoding operations. Through the decoding operation, the COW corresponds to an isolated and contiguous three-error symbol position.

The step 134 determines whether the COW passes the error detection. If it passes, the process proceeds to step 136, or otherwise its goes back to step 124. The carrier acquisition completes in step 136 where the T and SC are generated and COW is completely configured for signal transmission and reception. In short, in this embodiment, since there is only one preamble, the above described method helps to configure the location of the COW.

Figure 5:
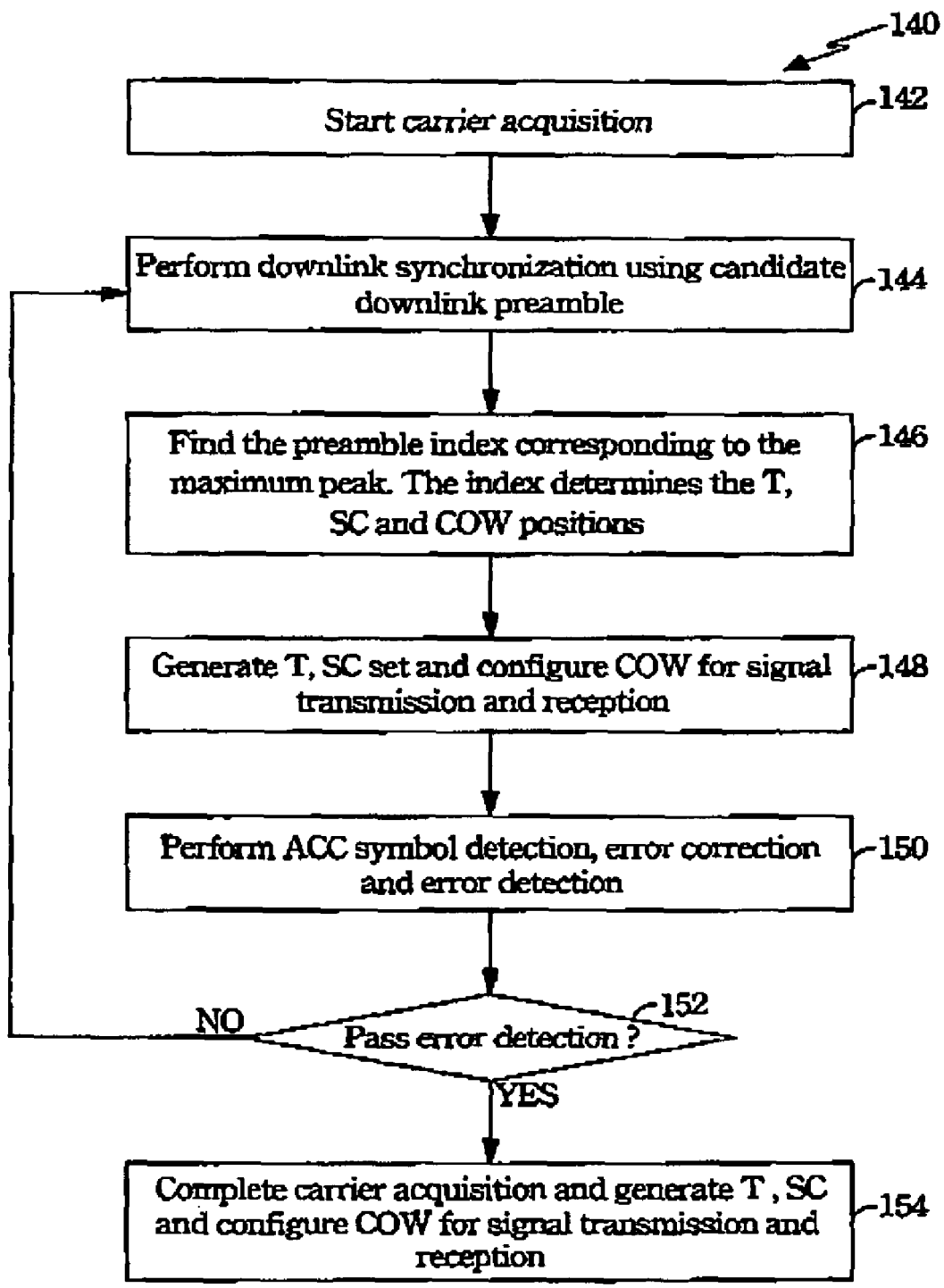
FIG. 5 illustrates a flowchart for detecting a channel observation window index in accordance with another embodiment of the present invention.
Figure 6:
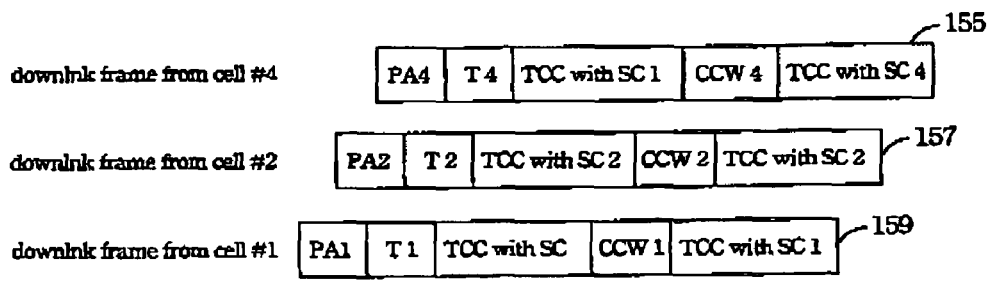
FIG. 6 illustrates downlink frames that are used by the flowchart shown in FIG. 5 in accordance with another embodiment of the present invention.

FIG. 5 illustrates a flowchart 140 for detecting the COW index in accordance with another embodiment of the present invention. In this embodiment, the configurations of the downlink frames 155, 157, and 159 corresponding to this method are shown in FIG. 6. It is noted that there is no timing offset for the frames 155, 157 and 159 in this embodiment.

There is a set of SCs for broadcasting the downlink preamble as opposed to the same SC used in FIG. 3. The different SCs are used by different cells. The BCD assigns each base station with a predetermined SC for modulating the preamble. It is programmed so that neighboring cells have different SCs for their preambles to differentiate them in the carrier acquisition process. In this embodiment, since multiple preambles are used, they have their corresponding sets of Ts and COWs.

Referring back to FIG. 5, the carrier acquisition process starts in step 142. A downlink between a mobile terminal and its desired base station is established by having the mobile terminal synchronized with the base station using the predetermined downlink preambles in step 144. This may take some search effort, and the appropriate preamble is finally found and synchronized. A predetermined set of spreading codes are used for broadcasting the downlink preamble, but each BS is assigned with a distinctive SC for carrying the preamble. For neighboring cells, in order to help detect the right preamble, the SCs are desirable to be different.

Since the mobile terminal knows the SCs used in the system, it can search for the strongest preamble presented using all the SCs in a parallel or serial manner in step 146. The SCs are designed to have low cross-correlation. Once the preamble modulated by the correct SC is located, the corresponding T and COW positions can also be determined. In practice, a maximum peak can be located for the predetermined preamble identifiable by a predetermined index, its corresponding SC is now known to the mobile terminal corresponding to this index. With the known preamble and known SC, they probably can identify the channel configuration set that should be used for the downlink communication. That is, based on the index, the T and COW should be detected accordingly.

For instance, if a mobile terminal enters cell 1, and it finds a peak that represents the preamble modulated by SC1 being the strongest, it knows that it is now under the coverage of the base station in cell 1 and the index may be 1 for identifying the channel configuration set 1. The mobile terminal then identifies itself to the base station. Because SC1 and PA1 are now known based on index 1, the T is then identified and the COW for the regular transmission and reception is now configured accordingly in step 148.

In one example, the mobile terminal can store a list of possible SCs, and when identifying the appropriate preamble, the stored SCs are searched one by one. However, if the storage space in the mobile terminal is to be saved, the SC can be generated by the mobile terminals. For example, once the preamble is found, its index is identified. Assuming the mechanism to generate the SC for this configuration set is known both to the BS and the mobile terminal, SC(i)=f(i), where f(i) stands for a function for generating the SC, can derive the appropriate SC based on the index. It is noted that the T can also be generated dynamically based on the same index, thereby freeing the memory resources for other purposes. The on-demand generation of these parameters also makes the entire system scalable, i.e., the same scheme can be applied if more channel configuration sets are required. The above described embodiment requires no detection for power level or error-correction-assisted COW detection is necessary. Neither needed is the frame offset.

The determination of the particular channel configuration set is further verified by performing symbol detection, error correction, and error detection using signals on the ACC. In step 152, if the error detection result confirms that the detected carrier is the right one, the process proceeds to step 154, or otherwise it goes back to step 144. The carrier acquisition completes in step 154.

Figure 7:
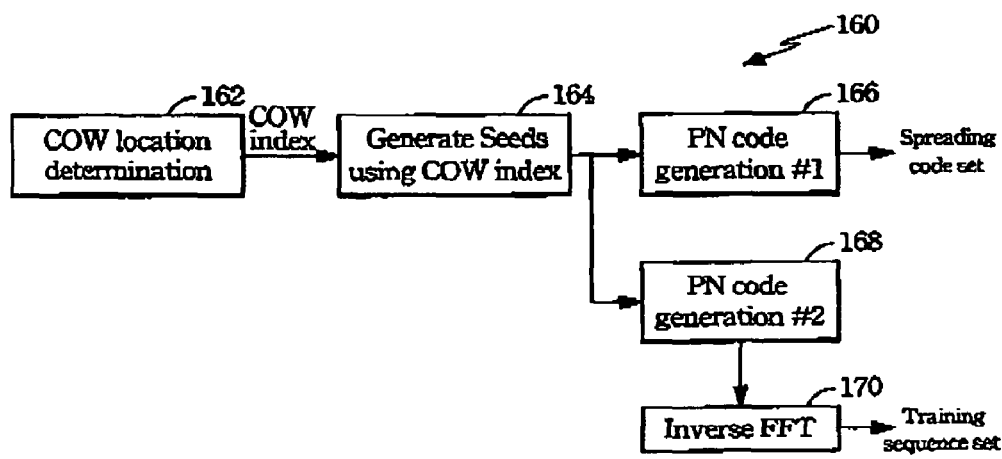
FIG. 7 illustrates a functional block diagram for generating a spreading code set and a training sequence set in accordance with another embodiment of the present invention.

FIG. 7 illustrates a functional block diagram 160 showing a system for generating SC and T sets in accordance with the embodiments of the present invention. In this embodiment, the T is essentially a cyclically shifted orthogonal sequence. The whole sequence set containing all the training sequences needed can be derived by cyclically shifting a basic sequence $c(0)=c_0 c_1, \ldots, c_{N_{PT}-1}$. As such, the sequence has the following property:

$$\sum_{m=0}^{N_{PT}-1} c^*_{(m+k)N_{PT}} c_{(m+l)N_{PT}} = \delta(k-l)$$

where $(\cdot)N_{PT}$ is the remainder with base $N_{PT}$. Thus $c(k)$ and $c(l)$ are cyclic orthogonal if $k \neq 1$. This property can be utilized to perform joint channel estimation for multiple users. Multipath channels of two mobile terminals, $h_1$, and $h_2$, can be estimated using $c(k)$ and $c(l)$, respectively, if $|K-l|>Lc$ where Lc is the maximum channel order. The cyclic shift orthogonal sequence also has the following property related to a special circular matrix. Let $C=[c^r(0), c^r(1), \ldots, c^r(N_{PT}-1)]$, which is a circular matrix, then $$C = F^* \Phi F$$

where F is the discrete Fourier transform (DFT) matrix, $\Phi$ is a diagonal matrix with diagonal elements being complex numbers of unit magnitude, and $\text{diag}(\Phi)=F \cdot c^r(0)$. Therefore, a basic training sequence $c(0)$ can be generated by performing inverse DFT of a complex value sequence with unit magnitude and with the same length as $c(0)$. If the length of $c(0)$ is the power of 2, fast Fourier transformation (FFT) can be applied. Since a pseudo-random noise (PN) binary sequence made up by +1 and −1 can be regarded as a random complex value sequence with phase randomly jumping between $+\pi$ and 0, the joint dynamic generation of pseudorandom number (PN) and training sequence is possible.

As described above, once the COW location is determined in step 162, the corresponding index (e.g., referred to as COW index) is used for generating the seeds for the PN in step 164. For example, this operation can use a lookup table with the index being the pointer to one or more seeds. The seeds may be any random number and serve as initial conditions for later PN generation. The seeds are determined such that the generated corresponding PNs have lower cross correlations.

With the seeds provided, the SC set can be generated by a PN code generator in step 166. For example, single linear feedback shift register (LFSR) can be used for m-sequence generation, or double LFSRs can be used for Gold-sequence or Kasami-sequence generation. The output of the sequence is truncated into one or more segments to form a SC set for the base stations to use. The length of the segment may be equal to that of the spreading factor of the system. The sequence contents in the SC set can be used for spreading channels in the TCC portion of the uplink and downlink frames, as well as for spreading the probing channel.

A second PN code generating process 168 can use the same or different PN generation structure for generating the training sequence. The sequence output obtained from the PN code generation is also truncated into one or more segments. The length of the segment is equal to the length of the basic training sequence. Each segment of the generated sequence is further utilized to generate the T set according to the above operation using an inverse FFT operation in step 170.

An advantage of the aforementioned determination and generation of the T, SC, and COW sets is that it enables further interference reduction utilizing an extra degree of freedom provided by the multiple antennas at the base station. As it will be clear later, reliable interference characteristics are captured using the COW data, thereby leading to robust estimation of spatial signature using the T of the TCC or probing channel. By converting a vector channel into a scalar channel using uplink or downlink nulling, and reassigning carriers based on interference intensity measurement from the COW data also realize an effective approach of interference reduction and performance enhancement in the wireless environment. With a proper frame and modulation planning, a multitude of interference mitigation at each base station can be achieved based on the accurate estimation of the T, SC, COW sets.

A first method is to implement inter-cell interference averaging for both the traffic and training sequence by selecting the SCs and Ts with low mutual cross-correlation. A second proposed approach is to utilize COW to capture the inter-cell interference characteristics to help form both uplink and downlink weights, which are applied to convert the vector channel into a scalar channel. With the appropriate weights, it suppresses inter-cell interference for both the training sequence and traffic signals. Once the channel estimation (e.g., spatial signature estimation) is performed based on the training sequence, joint detection or equalization is further performed to remove intra-cell interference caused by multipath delay dispersion as well as the inter-cell interference.

The channel estimation is more accurate and the interference reduction is greatly improved.

Figure 8:
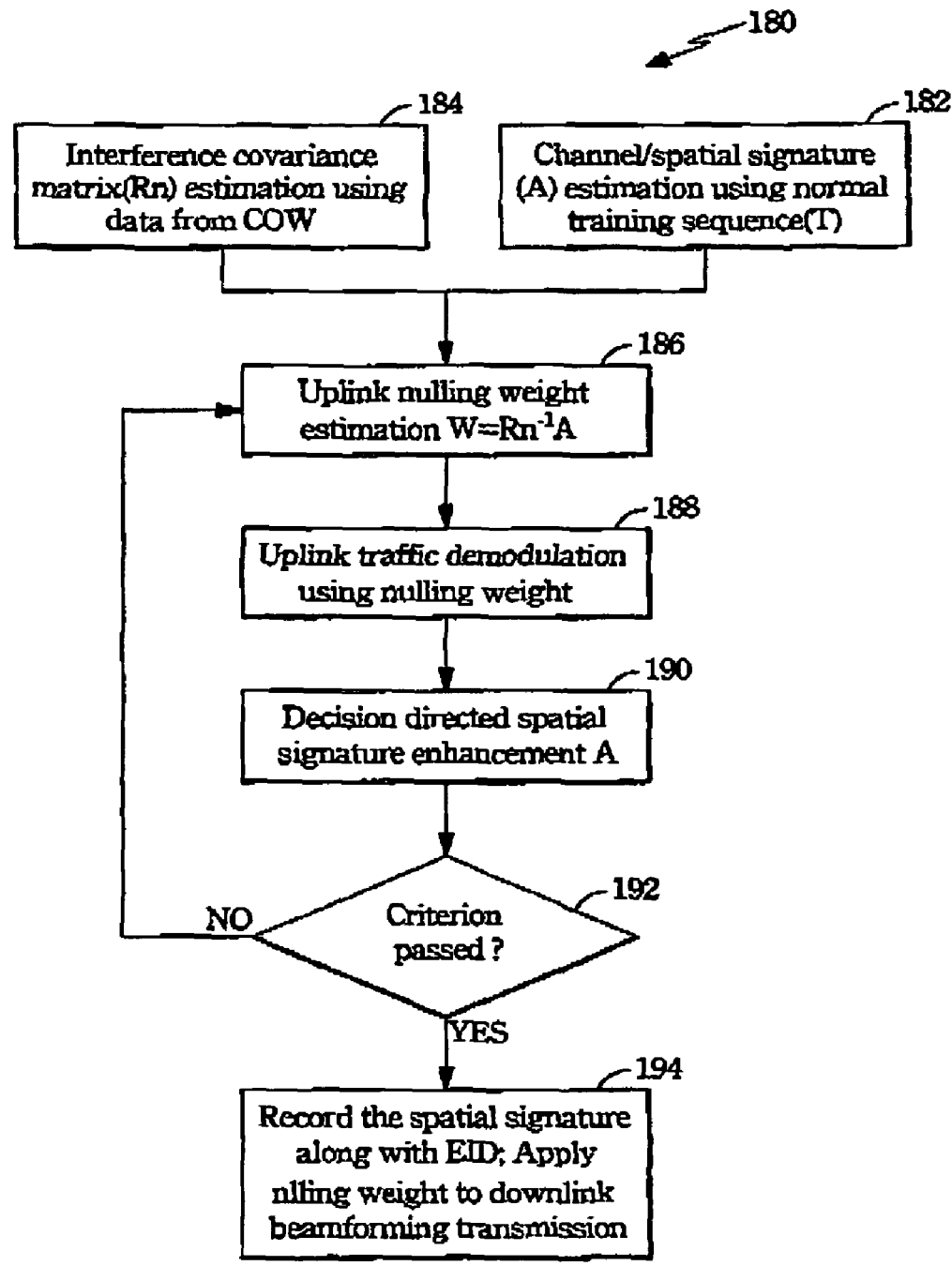
FIG. 8 illustrates a flowchart for enhancing an estimation of a spatial signature in accordance with another embodiment of the present invention.

FIG. 8 illustrates a flowchart showing a method 180 for a spatial signature enhancement in accordance with one embodiment of the present invention. A spatial signature is estimated in step 182 using the T generated by methods described above. For illustration purposes, the T being sent by the jth base station is denoted by $t_j$, and it is assumed that the base station is equipped with M antennas and each mobile terminal is equipped with one antenna. The uplink vector channel impulse response for the ith mobile terminal with regard to jth base station is described by the following channel matrix:

$$H_{ji} = [h_{ji1}^T, \ldots, h_{kiM}^T]$$

where $h_{jim}$ is a L+1 vector denoting the channel effect of the mth antenna. Assuming that the uplink receptions of the intra-cell signal and the inter-cell signal are time aligned, the uplink received training sequence at the target base station for the mth antenna can be described as follows:

$$x_{1im}^t(n) = t_1(n) \otimes h_{1im}^T(n) + \sum_{j \in J, j \neq 1} t_j(n) \otimes h_{jkm}^T(n) + v(n)$$

where jth is the index set of relevant base stations and v is the thermal noise term. Since each antenna is affected by inter-cell interference, channel taps with little power cannot be estimated accurately. This in turn degrades the performance of joint detection or equalization if the antenna estimation is employed directly. However, since characteristics of inter-cell interference plus thermal noise can be captured using the base station specific COWs, an uplink nulling weight can be estimated to achieve a better result, which will be explained in detail later.

In this embodiment, the spatial signature is determined to be the vector taking antenna tap values from the strongest tap after correlating with the training sequence, i.e., $$a_{1im}(d) = \sum_{n=1}^{Nt} t_1^*(d, n) x_{1im}^t(n),$$

$$d = 0, \ldots, L$$

$$m = 1, \ldots M$$

where d is the cyclic offset; t1 ($d_{max}$, n) is the sequence corresponding to the strongest tap; and Nt is the length of the training sequence. Supposing the interference covariance matrix (which provides the interference information) is estimated from the COW window as Rn, which is estimated using COW data in step 184, the uplink nulling weight can be computed in step 186 as follows:

$$w_{1i} = R_n^{-1} a_{1i}(:, d_{max})$$

where $a_{1i}(d_{max}) = [a_{1i1}(d_{max}), \ldots, a_{1iM}(d_{max})]^T$. With Rn, available, a much cleaner scalar channel impulse response $g_{li}$ with suppressed interference is obtained by the following spatial processing (or a nulling operation):

$$g_{li} = w_{1i}^* a_{1i}(0:L)$$

where $a_{1i}$ is the spatial signature for each tap, and is essentially derived based on the vector channel impulse response plus certain noise.

The scalar channel impulse response $g_{li}$ can be used for detecting uplink symbols. The uplink nulling weight is used to perform the symbol detection for the traffic/control data in step 188. After the initial round of symbols detection for the traffic/control data is conducted with a given initial nulling weight, the symbols are treated as a training sequence and a refined spatial signature is obtained in step 190. As long as the symbol error rate of the first round symbol detection is below a predetermined threshold (determined in step 192), the spatial signature estimation can be enhanced significantly. The uplink nulling weight can then be re-computed, and the second round symbol detection is performed to get a better symbol error rate performance. Multiple of the iterations can be performed, and a stop criterion, such as either a fixed number of iterations or SINR improvement, can be used for each additional round. If the criterion is met, the process goes from the step 192 to the step 194, or otherwise it goes back to the step 186. The spatial signature and equipment identification (EID) is recorded in step 194. The uplink nulling weight is then used for generating one or more downlink nulling weight for performing the downlink beamforming transmission.

As can be seen from the illustration above with regard to FIG. 8, the interference information from the COW is used along with the spatial signature based on the training sequence, which is interfered by the other cells, so that a set of noise nulling weights are generated for downlink beamforming. Therefore, a much cleaner signals can be obtained at the mobile terminal.

In FIG. 9, another approach is taken for enhancing more accurate estimation of the initial spatial signature according to another embodiment of the present invention. BS specific probing channels (PC) are defined in order to facilitate more accurate estimation of the initial spatial signature for each mobile terminal by reducing frequency reuse through transmission scheduling. The reduction of frequency reuse for the probing channel is feasible without significant loss of spectrum efficiency since each PC carries only a small amount of information. As shown, probing channel P1, P2, and P4 are used for uplink frames for different cells. In the probing channel, there is no interference from other users. As such, it helps to get a better spatial estimation.

FIG. 10 illustrates an example of the structure of the probing channel according to one embodiment of the present invention. In the figure, N PCs are defined in each frame. PC i (k) denotes kth probing channel in the ith cell. One probing channel consists of a probing training sequence (PT) and limited information bearing symbols (PS) modulated with spreading code. PT i (k) denotes kth probing training sequence in the ith cell.

The information in the probing signal contains at least the identification of the mobile terminal sending the probing signal, e.g., equipment identification (EID). The training sequence and spreading code can be obtained from the BS specific training sequence and spreading code set. In addition, a BS specific transmission selection function (TSF) is built in at the mobile terminal. The input of the TSF is one or more integer numbers, and the output of the function is an integer from 0 to N. The mobile terminal sends the probing channel if and only if TSF>0 and the PC index is also given by TSF. For mobile terminals inside any cell, the transmission of the probing signal is scheduled in order to reduce both the collision of intra-cell mobile terminals and the inter-cell interference.

Figure 11:
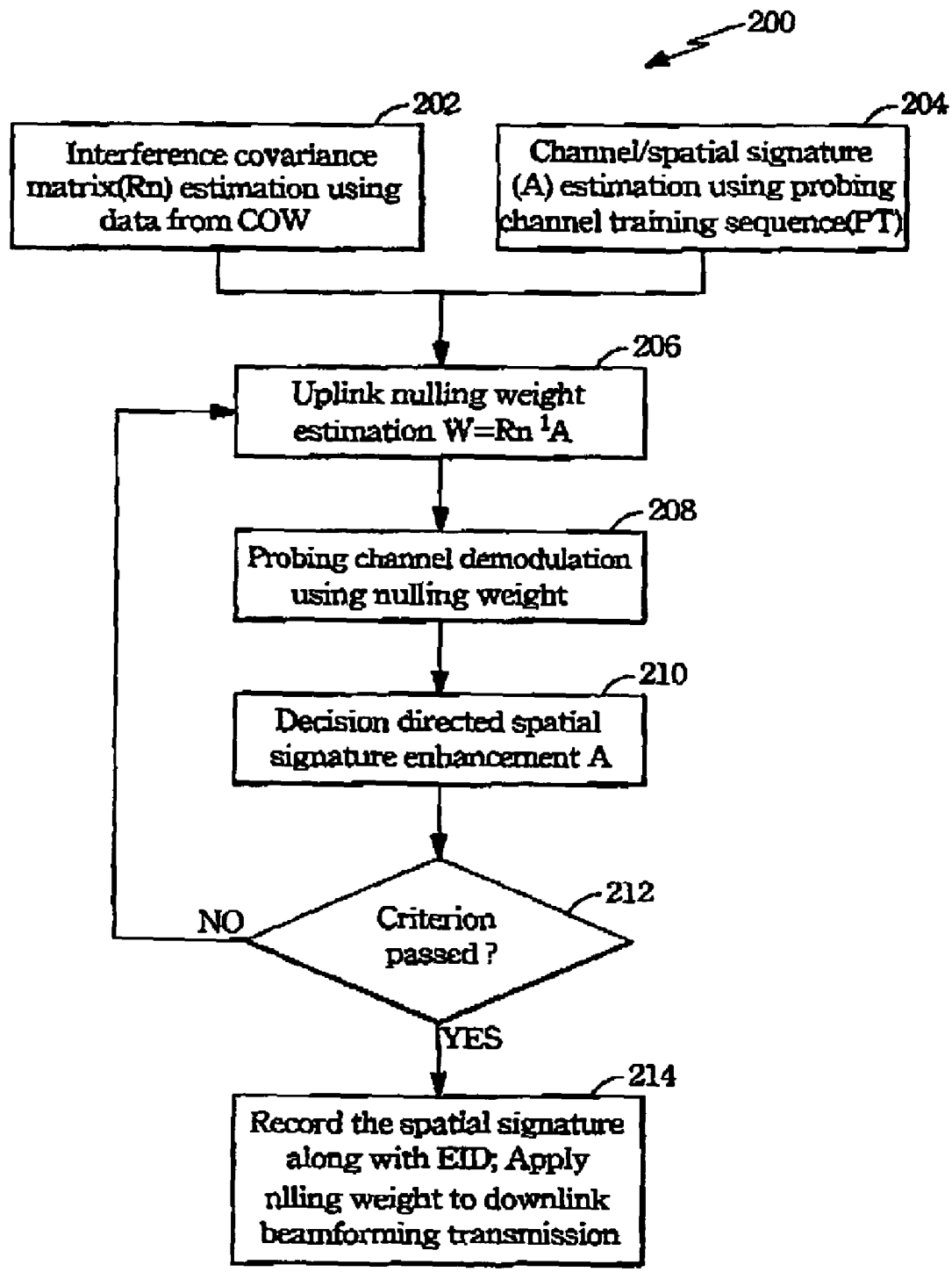
FIG. 11 illustrates a flowchart for enhancing a spatial signature using the probing channel in accordance with another embodiment of the present invention.

FIG. 11 illustrates the flowchart 200 of spatial signature enhancement using the probing channel. This is similar to FIG. 8 except that the probing channel is used to get a better estimate of the spatial signature from the training sequence. Whenever the spatial signature is obtained from the probing channel, it shall be applied to the initial round of symbol detection for the traffic/control data, if necessary. More specifically, in step 202, the interference covariance matrix is obtained using data observed from COW. On the other hand, the channel spatial signature is estimated using the training sequence through the probing channel in step 204. A set of uplink nulling weights are generated in step 206, and further used for the probing channel demodulation in step 208. Based on the result of the demodulation and symbol detection, an enhancement can be directed in step 210. As long as the symbol error rate of symbol detection is below a predetermined threshold (determined in step 212), the nulling weight can then be recomputed, and another round of symbol detection is performed to get a better symbol error rate performance. Multiple of the iterations can be performed, and a stop criterion, such as either a fixed number of iterations or SINR improvement, can be used for each additional round. If the criterion is met in step 212, the process goes to the step 214, or otherwise it goes back to the step 206. The spatial signature and equipment identification (EID) is recorded in step 214, and the nulling weight is then used for performing the downlink beamforming transmission.

FIG. 12 is an example of scheduling probing channels for mobile terminals in 3 cells for three consecutive frames, with N=3 PC in each frame. In this figure, some collision happens due to bad management. Again, it is assumed that the frequency reuse factor equals one for a normal training sequence and traffic/control signal. Suppose the frequency reuse factor for the probing channel (FRFP) is set to seven, then all neighboring cells shall have different transmission times for the probing channel.

In this case, referring back to FIG. 2, the index for generating the channel configuration set (T, SC, COW) is also used for scheduling the probing channel to avoid inter-cell interference. Since multiple PCs are available in each frame, multiple mobile terminals inside one cell are allowed to transmit in the same frame, and possible PC collision may occur. In actual systems, to increase PC capacity, partial neighboring probing inter-cell interference may be allowed.

In a preferred embodiment for PC scheduling, the BS broadcasts the frame number (FN), the number of probing channels (Np), the probing index (PI), and the frequency reuse factor for the probing channel (FRFP) at each frame. Suppose in order to capture the channel variation due to mobility and/or timing offset, each mobile terminal needs to probe the channel every Nd frames and the maximum number of mobile terminals in each cell is Nterm, the probing bandwidth is given by:

$$\rho = \frac{N_{term}}{N_d \cdot N_p \cdot FRFP}$$

The FN takes a number from 0 to $N_f$ ($N_f \geq N_{term}$). It is preferred that all BSs send the same frame number at any instant of time. Each mobile terminal has an associated unique equipment identification number (EID). The input to the TSF is the FN and the EID. Suppose the normal training channel and traffic channels have a frequency reuse factor equal to one.

To reduce frequency reuse for the probing channel from one to FRFPI, TSF shall first select a subset of frames available for transmitting probing channels for the target BS. Then the FN and EID are used to determine whether the mobile terminal should send a probing signal. Each BS is assigned a probing index (PI) I, i=0, . . . , FRFP−1. The following operations are performed at the mobile terminal:

```
if mod(FN,FRFP) == i & &|FN / FRFP| == mod(EID,N_term)
    TSF = random (1:N)
else
    TSF = 0
end;
```

Where mod(A, B) gives the remainder when integer A is divided by B and random(1:N) generates a random integer number uniformly distributed between 1 and N. Here, mod (A, B) serves as a harsh function, and EID is the key. Preferably, Nterm is chosen to be the prime number not too close to the power of two. In the above logic, other hash functions of the EID can also be used in lieu of modulo operation on EID. The above operation achieves both intra-cell and inter-cell probing channel transmission scheduling. The scheme allows the probing channels at each BS to have a lighter frequency reuse scenario and, thus, the spatial signature estimation is more robustly obtained.

Even with intra-cell scheduling, collision may occur if the set of EIDs are not static for each cell. This is possible since nomadic or mobile terminals are normally supported in wireless data networks. In order to reduce further the intra-cell collision, it is preferred that probing signals are sent with intentional random delays. Specifically, even though the mobile terminal has the knowledge of the correct propagation delay, random delay is added to the transmission timing of probing signals in order for the BS to capture more easily the cleaner spatial signature corresponding to the peak of maximum power in the case of intra-cell collision.

An example of the random timing scheduling is shown in FIG. 13. In the nth frame, both mobile terminals #1 and #2 send PC 1(2). However, due to the relative delay between the two received sequences, spatial signatures of both mobile terminals can be estimated reliably. An effective way of random delay scheduling is to design a PT sequence with cyclic shift orthogonal sequences described earlier for the normal training sequence.

Suppose intra-cell users share the same basic cyclic shift orthogonal sequence, $c(0)=c_0 c_1, \ldots, c_{NP-1}$. Each user shall select one cyclic shifted version of the sequence:

$$c(k)=c_k c_{k+1}, \ldots, c_{PT-1}, c_0, \ldots, c_{k-1}$$

Where k is the shift value and $N_{PT}$ is the number of chips for the sequence. In conventional methods of transmission, if two users send probing channels using the same shift value, collision will occur and spatial signatures overlap. Random delay can reduce the collision effect. For example, if a mobile terminal is informed to send a training sequence at timing instant t1, a random delay of d1, chips is added to make the actual transmission time to be t1+d1. If a second intra-cell mobile terminal happens to send signals through a probing channel using the sequence with the same shift value but with a different random delay of d2 chips, the receiver at the BS shall observe two peaks spaced by $|d_2-d_1|$ chips after correlation. If $|d_2-d_1| \geq L+1$, where L is the order of multi-path channel, the spatial signatures of both users a1 and a 2 can be extracted from the position corresponding to the peak.

In practice, only the vector corresponding to the strongest peak is extracted and treated as the spatial signature of the potential probing channel. The validation of the spatial signature is further performed by decoding the message carried in the PC. If the message passes error detection, the spatial signature is deemed as valid and it is recorded along with the EID extracted from the message. As such, by allowing a small amount of uplink transmission offset for the probing channel, the spatial signature can still be estimated reliably, even when collision occurs.

If other significant peaks are detected, which are located at least L+1 chips away, vectors corresponding to these locations are extracted as spatial signatures of intra-cell colliding probing signals, here denoted by B=[b1, . . . , bc].

With the correct spatial signatures determined, nulling can be employed to remove inter- and intra-cell interference and help correctly demodulate messages carried in the PS segment of the probing channel. A preferred embodiment of determining the nulling weight for this purpose is to utilize both the COW window data J=[ji, . . . , jNcow] and B. The former represents inter-cell interference, and the latter represents intra-cell interference.

Referring back to FIG. 11, the interference covariance matrix is estimated from the data obtained from COW in step 202, and thus computed as follows:

$$R_n = B \cdot B^* + J \cdot J^*$$

The spatial signature (A) is also estimated using the probing channel training sequence (PT) in step 204. Then the nulling weight is estimated in 206 as $w = R_n^{-1} A$. The aforementioned iterative spatial signature enhancement can also be applied. With the uplink nulling weight, the probing channel demodulation is done with such weight in step 208. The estimated spatial signature A and EID are associated and recorded for future applications, and the nulling weight may be applied to downlink beamforming in step 214. Since the probing signal is sent periodically, the spatial signature A and EID records are also updated periodically. The downlink nulling reduces significantly the interference to mobile terminals in other cells. As a result, the channel estimation shall be made more reliable.

Both uplink and downlink nulling operations have their limitations. They work best when the correlation between spatial signatures of the desired user and interference are below certain thresholds. In addition, if interferences span high dimensions, the nulling performance also degrades. In other words, if either the interference has the similar directions with the desired signal or the interference comes from many directions, the nulling may not work very well. Under this condition, COW-based dynamic carrier assignment (DCA) can be employed to switch the suffered mobile terminal to a cleaner carrier.

The ideal is to measure the interference intensity after the nulling operation for both the uplink and downlink using COW data. In general, for wireless systems with smart antennas, the inter-cell interference level of uplink and downlink channels is not symmetric. Therefore, the DCA can be initiated by either the mobile terminal or the base station. If using downlink COW data, the mobile terminal measures excessive interference in certain carriers in which communication is going on while finding some other carriers cleaner. The mobile terminal sends a switch request to the base station through the probing channel with the indexes of the cleaner carriers. The BS shall re-allocate a carrier for the ten-ninal in accordance with the updated information.

If, when using the uplink COW data, the BS determines that a certain carrier is heavily interfered by other cells and a mobile terminal is communicating using that carrier, the base station shall also re-allocate the carrier for the mobile terminal.

As such, the disclosed invention provides an integral set of techniques for inter-cell interference mitigation, such that channel estimation based on training sequence is robust in the high frequency reuse scenario. Accordingly, advanced signal processing techniques designed to handle multi-path interference are able to produce good link performance.

In summary, the present disclosure provides an effective method and system for radio frequency interference reduction in a wireless communication system through jointly assigning a base station specific training sequence set, spreading code set, and channel observation window set. Training sequence, spreading codes, and channel observation window are operation parameters constitute an integral part of a frame and modulation definition. Each mobile terminal can automatically identify and configure such system operation parameters. By accurately estimating the channel delay dispersion effect and inter-cell interference characteristics, advanced signal processing techniques can be utilized to improve performance under various types of interference. In addition to the interference averaging effect of the base station specific pseudo-random spreading code and training sequence, multiple antennas at the base station can perform downlink and uplink nulling operations that actively suppress the inter-cell interference. The effective nulling is possible through utilizing the base station specific channel observation window to reliably capture interference characteristics. Iterative symbol decision directed and/or scheduled probing channel assisted spatial signature enhancements are introduced to obtain better nulling performance.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A system comprising:
    a base station control device (BCD) configured to generate one or more parameters for operating one or more base stations (BSs);
    a first BS configured to cover a first cell having one or more mobile terminals therein, wherein the first BS is configured to communicate with the BCD;
    a second BS configured to cover a second cell neighboring the first cell having one or more mobile terminals therein and sharing a predetermined frequency band with the first cell, wherein the second BS is configured to communicate with the BCD;
    wherein the BCD generates and transmits to the first BS and second BS parameters that the first BS and second BS use to construct downlink radio frames for communications with any mobile terminal in their respective first and second cells, wherein the BCD generates the parameters for the first BS and second BS such that downlink radio frames used for communication in the first and second cells are distinguishable from each other according to different channel configuration sets, each channel configuration set comprising one or more training sequences having a pseudo random complex value sequence, spreading codes used to spread traffic messages and control messages, and channel observation window positions in downlink radio frames communicated in the first and second cells, respectively;

wherein the BCD generates the channel configuration sets such that the downlink radio frames that the second BS transmits in the second cell are offset in time from the downlink radio frames that the first BS transmits in the first cell with respect to global position signal information in order to isolate the downlink radio frames that the second BS transmits in the second cell from the downlink radio frames that the first BS transmits in the first cell;

wherein a mobile terminal in the first cell or second cell generates random access packets and traffic data packets in accordance with the spreading code and training sequence depending from which of the first and second BSs a downlink radio frame is received; and wherein the first BS and the second BS, upon receiving commands from the BCD, which commands comprise the channel configuration set assigned to the first BS and the channel configuration set assigned to the second BS, respectively, configures downlink radio frames accordingly.

2. The system of claim 1, wherein the BCD is configured to generate a first channel configuration set for the first cell, wherein the first channel configuration set defines a first training sequence, a first spreading code and a first channel observation window position, and is configured to generate a second channel configuration set for the second cell, wherein the second channel configuration set defines a second training sequence, a second spreading code and a second channel observation window position, wherein the first channel configuration set and the second channel configuration set enables detection of interference between downlink radio frames transmitted by the first BS and downlink radio frames transmitted by the second BS.

3. The system of claim 1, wherein the first BS and the second BS are configured to transmit downlink radio frames that are configured to allow a mobile terminal to synchronize with the first or second BS when entering the first cell or the second cell, respectively, and to thereby determine the channel configuration set in use for that cell based on reception of the downlink radio frames and for use in communicating with the first BS or second BS, respectively.

4. The system of claim 2, wherein the first BS and the second BS are configured to generate and transmit downlink radio frames in the first and second cells, respectively, each downlink radio frame comprising a preamble slot, a training slot, a channel observation window slot whose position is determined by the channel observation window position defined in the corresponding channel configuration set and one or more traffic or control slots in which traffic or control information is sent, and wherein the BCD is configured to assign the first and second cells with a frequency band that is shared by one or more neighboring cells having predetermined channel configuration sets.

5. The system of claim 2, wherein the BCD is configured to generate the channel configuration set for the first cell and for the second cell so as to define the first channel observation window position in downlink radio frames transmitted by the first BS in the first cell and the second channel observation window position in downlink radio frames transmitted by the second BS in the second cell, wherein each channel observation window position is a time frequency slot in a downlink radio frame in which either no intra-cell communications are sent or in which a known signal is transmitted for intra-cell communications.

6. The system of claim 1, wherein the first BS and the second BS are configured to generate a training sequence from a basic training sequence that is a pseudo-random complex value sequence having a periodic auto-correlation cyclic shift orthogonal property.

7. The system of claim 3, and further comprising one or more mobile terminals each configured to determine a channel observation window position by detecting power levels associated with one or more symbols contained in the one or more traffic or control slots of a received downlink radio frame, computing a ratio of an average power associated with the one or more symbols excluding power of symbols associated with the channel observation window with an average power level of symbols associated with the channel observation window, comparing the ratio with a threshold, and when the ratio satisfies the threshold, determining the channel observation window position based on positions of the one or more symbols in the one or more traffic or control slots.

8. The system of claim 4, wherein the first BS and second BS are configured, based on their respective channel configuration set, to transmit preamble sequences in their respective preamble slots of downlink radio frames using different spreading codes, and further comprising one or more mobile terminals each configured to detect a channel observation window position in a received downlink radio frame by detecting the preamble sequence contained in the received downlink radio frame and determining therefrom positions of the training slot and channel observation window slot in the received downlink radio frame.

9. The system of claim 1, wherein each of the first BS and second BS further comprises a first pseudo-random sequence generator that is configured to generate a first set of spreading codes, and a second pseudo-random sequence generator configured to generate a second set of sequences, wherein the first and second pseudo-random sequence generators use the channel observation window position as a seed.

10. The system of claim 9, wherein each of the first BS and second BS is configured to apply an inverse discrete Fourier transform of the second set of sequences in order to generate a set of basic training sequences.

11. The system of claim 2, wherein each of the first BS and second BS is configured to, based on the first channel configuration set and second channel configuration set, respectively, generate positions for the first and second channel observation windows at a symbol boundary in an associated downlink radio frame and such that the first and second channel observation windows have a length of multiple symbols and symbols in the first and second channel observation windows are at power levels lower than that of symbols in traffic or control slots.

12. A method comprising:

providing a first base station (BS) configured to service one or more mobile terminals in a first cell;

providing a second BS configured to service one or more mobile terminals in a second cell that is adjacent to the first cell, and wherein the first BS and the second BS share a predetermined frequency band for communication with mobile terminals in their respective cells;

at a base station control device, generating a first channel configuration set for the first BS that contains parameters for a first training sequence having a first pseudo random complex value sequence, a first spreading code used to spread traffic messages and control messages in the first cell and a first channel observation window position from which the first BS uses to generate downlink radio frames in the first cell and a second channel configuration set for the second BS that contains parameters for a second training sequence having a second pseudo random complex value sequence, a second spreading code used to spread traffic messages and control messages in the second cell and a second channel observation window position that the second BS uses to generate downlink radio frames in the second cell such that the downlink radio frames transmitted by the first BS in the first cell are distinguishable from the downlink radio frames transmitted by the second BS in the second cell;

communicating the first channel configuration set from the base station control device to the first BS and communicating the second channel configuration set from the base station control device to the second BS;

generating the first channel configuration set and the second channel configuration set such that the downlink radio frames that the second BS transmits in the second cell are offset in time from the downlink radio frames that the first BS transmits in the first cell with respect to global position signal information in order to isolate the downlink radio frames that the second BS transmits in the second cell from the downlink radio frames that the first BS transmits in the first cell;

at the mobile terminals, generating random access packets and traffic data packets in accordance with the first and the second spreading code and the first and the second training sequence depending from which of the first and second BSs a downlink radio frame is received; and the first BS and second BS, upon receiving the first and second channel configuration sets, respectively, from the base station control device, configuring downlink radio frames according to the first channel configuration set and the second channel configuration set, respectively.

13. The method of claim 12, wherein the first channel observation window position is a time frequency slot in downlink radio frames transmitted by the first BS in which either no intra-cell communications are sent or in which a known signal is transmitted for intra-cell communications and the second channel observation window position is a time frequency slot in downlink radio frames transmitted by the second BS in which no intra-cell communications are sent or in which a known signal is transmitted for intra-cell communications.

14. The method of claim 12, wherein configuring comprises the first BS and second BS generating the first training sequence and second training sequence from a basic training sequence that is a pseudo-random complex value sequence having a periodic auto-correlation cyclic shift orthogonal property.

15. The method of claim 12, and further comprising a mobile terminal synchronizing with the first BS or the second BS when entering the first cell or second cell, respectively, and determining the channel configuration set for communication with the first BS or the second BS, accordingly.

16. The method of claim 15, wherein synchronizing comprises determining a channel observation window position by detecting power levels associated with one or more symbols contained in the one or more traffic or control slots of a received downlink radio frame, computing a ratio of an average power associated with the one or more symbols excluding power of symbols associated with the channel observation window with an average power level of symbols associated with the channel observation window, comparing the ratio with a threshold, and when the ratio satisfies the threshold, determining the channel observation window position based on positions of the one or more symbols in the one or more traffic or control slots.

17. The method of claim 15, and further comprising the first BS and the second BS transmitting preamble sequences in preamble slots of their respective downlink radio frames using the first and second spreading codes, respectively, and further comprising a mobile terminal determining a channel observation window position in a received downlink radio frame by detecting the preamble sequence contained in the received downlink radio frame and determining therefrom positions of the training slot and channel observation window slot in the received downlink radio frame.

18. The method of claim 12, and further comprising the first BS generating a first set of spreading codes and a second set of sequences using the first channel observation window position as a seed and the second BS generating a first set of spreading codes and a second set of sequences using the second channel observation window position as a seed.

19. The method of claim 18, and further comprising the first BS generating a set of basic training sequences by an inverse discrete Fourier transform of the second set of sequences generated from the first channel observation window position and the second BS generating a set of basic training sequences by an inverse discrete Fourier transform of the second set of sequences generated from the second channel observation window position, wherein the first channel configuration set and the second channel configuration set enables detection of interference between downlink radio frames transmitted by the first BS and downlink radio frames transmitted by the second BS.

20. The method of claim 12, and further comprising the first BS transmitting downlink radio frames in the first cell and the second BS transmitting downlink radio frames in the second cell with a timing offset with respect to the downlink radio frames transmitted by the first BS in the first cell.

21. The method of claim 12, wherein configuring comprises the first BS, based on the first channel configuration set, generating the first channel observation window position at a symbol boundary in a downlink radio frame and such that the first channel observation window has a length of multiple symbols and symbols of the first channel observation window are transmitted at power levels lower than that of symbols in traffic or control slots, and the second BS, based on the second channel configuration set, generating the second channel observation window position at a symbol boundary in a downlink radio frame and such that the second channel observation window has a length of multiple symbols and symbols of the second channel observation window are transmitted at power levels lower than that of symbols in traffic or control slots.

22. A method comprising:

at a base station control device, generating multiple channel configuration sets each for a corresponding base station assigned to serve multiple terminals in a corresponding cell, wherein base stations associated with adjacent cells operate in the same radio frequency channel, wherein generating comprises generating a channel configuration set comprising a training sequence having a pseudo random complex value sequence, a spreading code used to spread traffic messages and control messages and a channel observation window position for downlink radio frames transmitted by the base station in its corresponding cell such that downlink radio frames transmitted by base stations for adjacent cells are distinguishable from each other;

generating the channel configuration sets such that the downlink radio frames transmitted by different base stations are offset in time with respect to global position signal information in order to isolate the downlink radio frames transmitted by the base stations;

at the terminals, generating random access packets and traffic data packets in accordance with the spreading code and the training sequence depending from which base station a downlink radio frame is received; and communicating the channel configuration sets from the base station control device to corresponding base stations.

23. The method of claim 22, and further comprising each base station generating a position for the channel observation window in downlink radio frames transmitted in its cell at a symbol boundary in the downlink radio frame and such that the channel observation window has a length of multiple symbols and symbols of the channel observation window are at power levels lower than that of symbols in traffic or control slots in an associated downlink radio frame.

24. The method of claim 23, and further comprising a mobile terminal determining a channel observation window position in a received downlink radio frame by detecting power levels associated with one or more symbols contained in the one or more traffic or control slots of a received downlink radio frame, computing a ratio of an average power associated with the one or more symbols excluding power of symbols associated with the channel observation window with an average power level of symbols associated with the channel observation window, comparing the ratio with a threshold, and when the ratio satisfies the threshold, determining the channel observation window position based on positions of the one or more symbols in the one or more traffic or control slots.

25. The system of claim 1, wherein the radio frames used for communication in the first and second cells contains a traffic channel and a control channel, wherein the control channel operates as a downlink access channel, and wherein the BCD assigns a spreading code to the access channel.

26. The system of claim 25, wherein the BCD verifies the channel configuration sets by performing symbol detection, error correction, and error detection using signals on the access channel.

27. The system of claim 1, wherein the mobile terminal uses a rotational error correction code to identify a channel observation window position.

28. The system of claim 27, wherein the mobile terminal identifies the channel observation window position based on a known spreading code.

29. The method of claim 12, further comprising, at the mobile terminal, using a rotational error correction code to identify a channel observation window position.

30. The method of claim 29, further comprising, at the mobile terminal, identifying a channel observation window position based on a known spreading code.

31. The method of claim 2, wherein the BCD is further configured to use a channel observation window index to generate seeds for a pseudo random number and to truncate the pseudo random number into segments in order to generate the training sequence for the channel configuration sets for the first BS and second BS.

32. The method of claim 1, wherein the first BS and the second BS reallocate channel observation window based carriers for the mobile terminal when the first BS and the second BS determine that the carriers are interfered by cells of other base stations.

* * * * *